Figure 1:
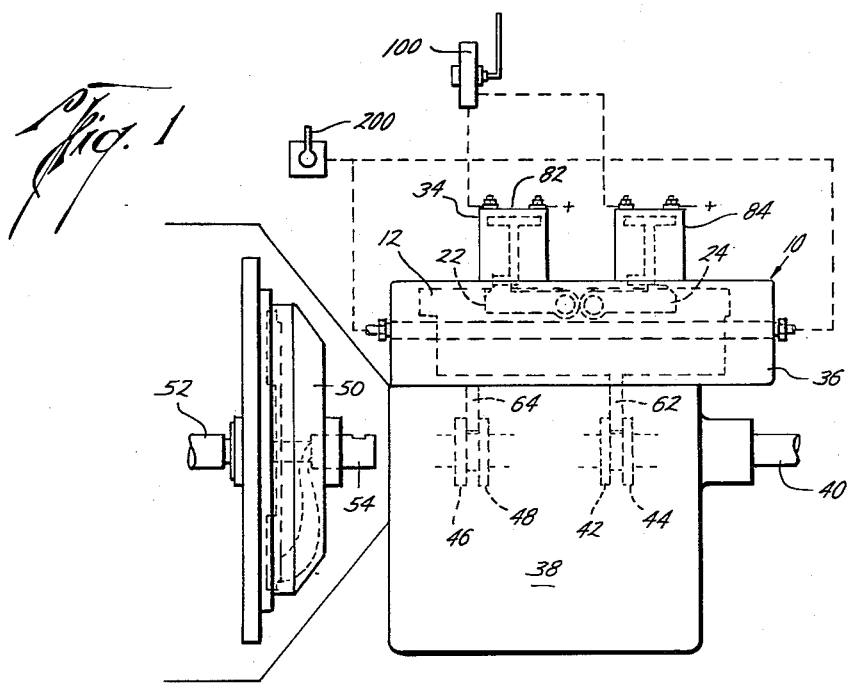

March 3, 1964 R. L. DYKES 3,122,936
GEAR SHIFTING MECHANISM
Filed Feb. 1, 1962 5 Sheets-Sheet 1

Robert L. Dykes
INVENTOR.

BY
ATTORNEYS

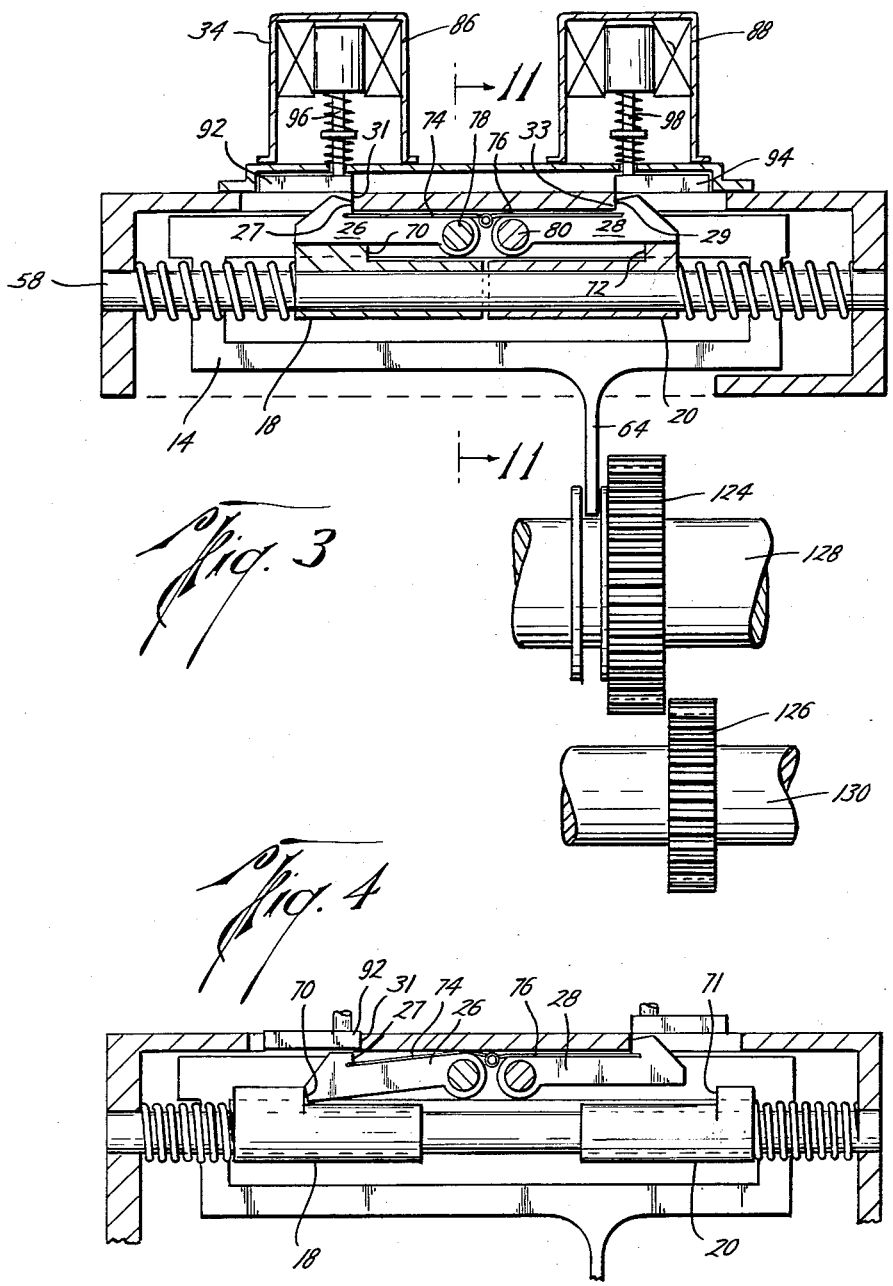

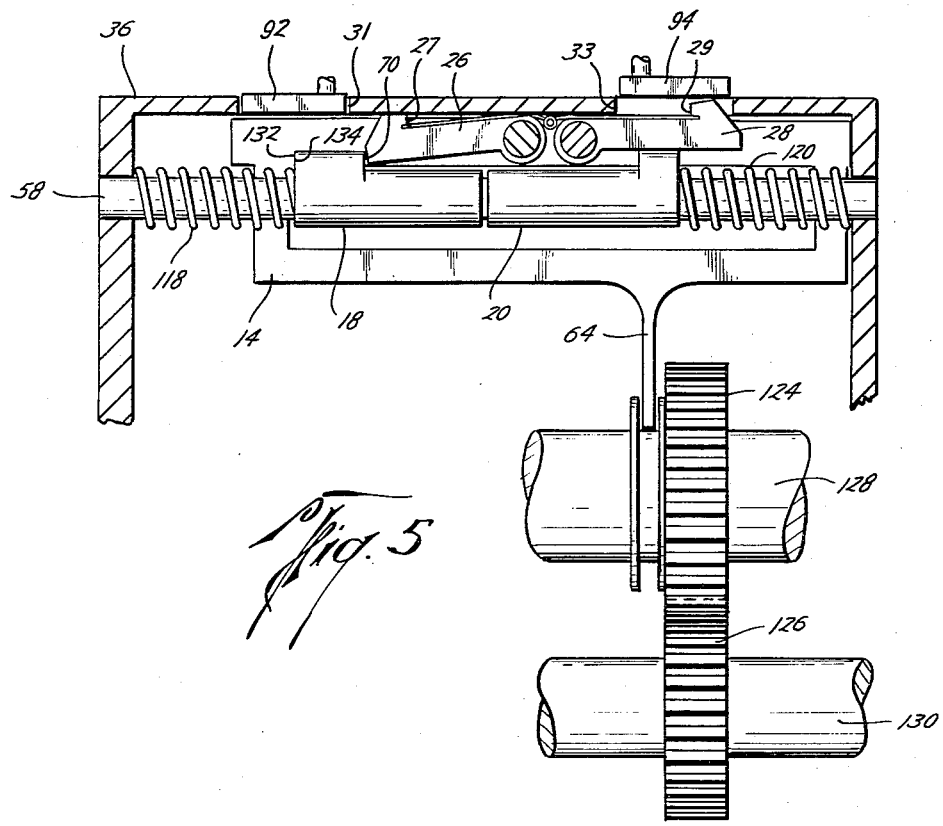
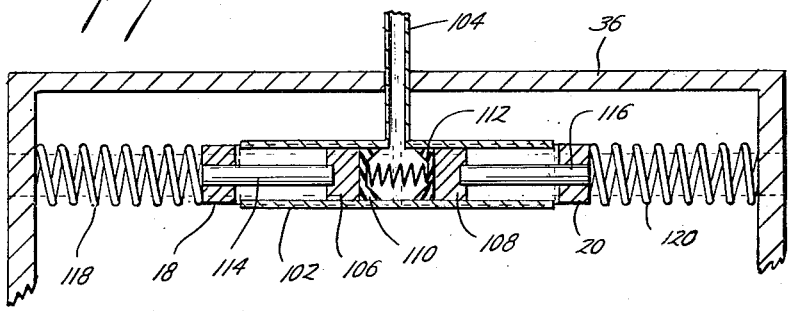
Robert L. Dykes
INVENTOR.
ATTORNEYS

Robert L. Dykes
INVENTOR.

March 3, 1964 R. L. DYKES 3,122,936
GEAR SHIFTING MECHANISM
Filed Feb. 1, 1962 5 Sheets-Sheet 5
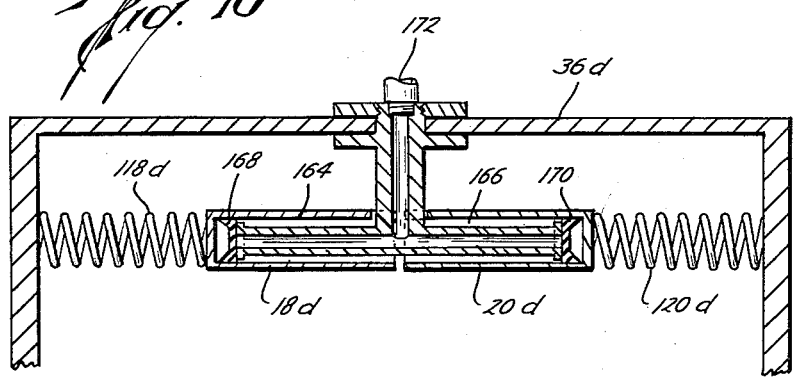
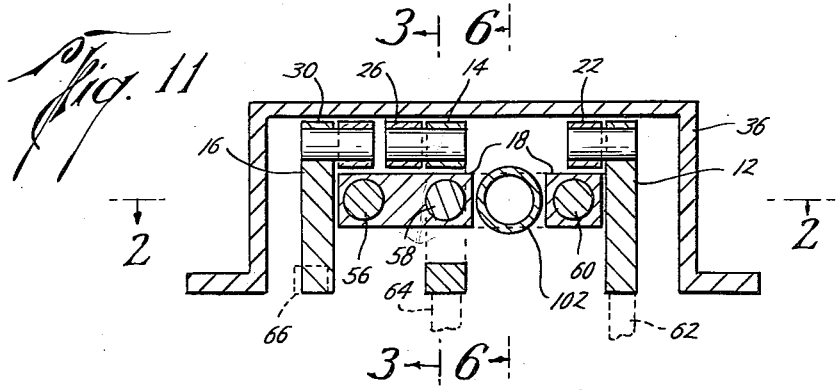
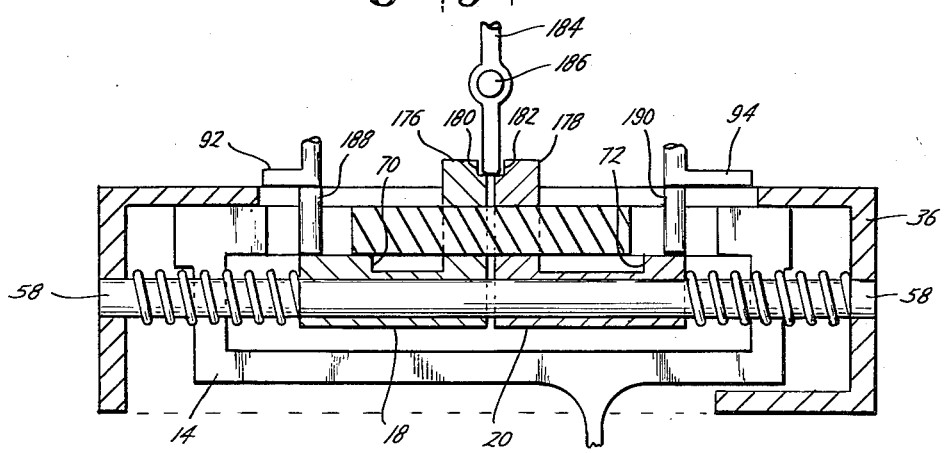
Robert L. Dykes
INVENTOR.
BY
ATTORNEYS

United States Patent Office 3,122,936
Patented Mar. 3, 1964

3,122,936
GEAR SHIFTING MECHANISM
Robert L. Dykes, Rte. 1, Noble, La.
Filed Feb. 1, 1962, Ser. No. 170,389
5 Claims. (Cl. 74—335)

The present invention relates to a gear shifting mechanism, and more particularly, relates to such a mechanism which may be operated both manually and automatically and which may be applied to automobiles, buses and trucks as well as other equipment for easily and quickly shifting gears. The present invention is an improvement to my gear shifting mechanism, Patent No. 2,785,779, issued March 19, 1957.

In general, and particularly with respect to trucks, considerable time is necessary in shifting the present gears which results in a loss of momentum of the truck. This results in a great strain on the gears and gear transmission. Also, in attempting to preserve the momentum of the vehicle, many operators shift rapidly and fail to completely engage the gears before releasing the clutch thereby further damaging the gears and transmission. Furthermore, and particularly with trucks, the driver must devote a considerable amount of attention to correctly controlling and shifting the gears. The present invention is directed to overcoming the above named disadvantages.

It is therefore a general object of the present invention to provide a gear shifting mechanism in which the operator may preselect the gear before performing the shifting operation.

It is yet a further object of the present invention to provide a gear shifting mechanism which considerably reduces the amount of time required in shifting from one gear to another thereby conserving the momentum of the particular vehicle or equipment to which the shifting device is applied.

Still a further object of the present invention is the provision of a gear shifting mechanism in which all of the gears can be changed by a preselection of the gear selector lever and the shifting of the gears may be performed automatically in accordance with that preselection.

Still a further object of the present invention is the provision of a compact gear shifting mechanism which requires fewer parts and is therefore cheaper to manufacture, easier to repair, cheaper to maintain and is more efficient and has a longer life.

Yet a still further object of the present invention is the provision of a gear shifting mechanism which may utilize two transmissions to provide multiple speeds through its ability to change the gears of two transmissions at the same time by the use of a single gear shifting control.

A still further object of the present invention is the provision of an automatic gear shifting mechanism which can be actuated by any desirable source of power.

Still a further object of the present invention is the provision of a gear shifting mechanism in which either an automatic or manual shifting control or combination thereof can be provided or in which remote control may be installed on any vehicle in which a variable speed is controlled by gears.

Figure 2:
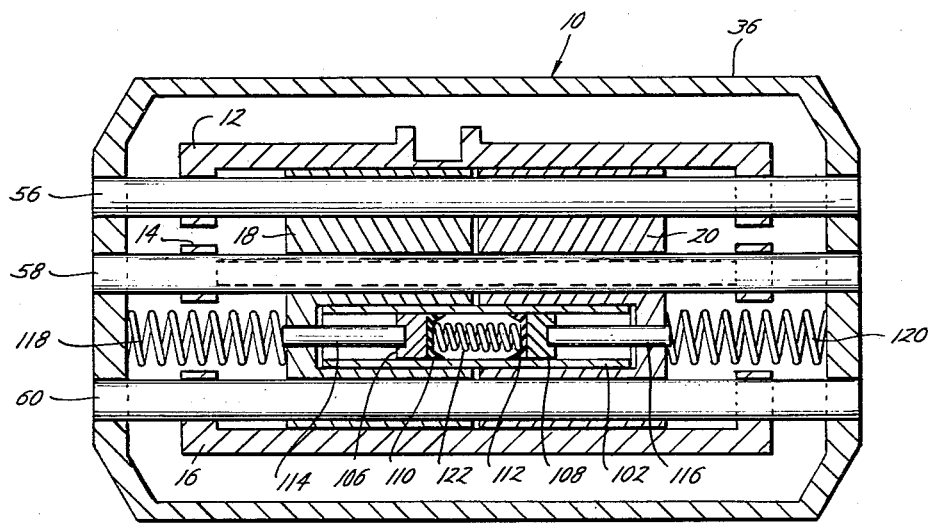
Figure 7:
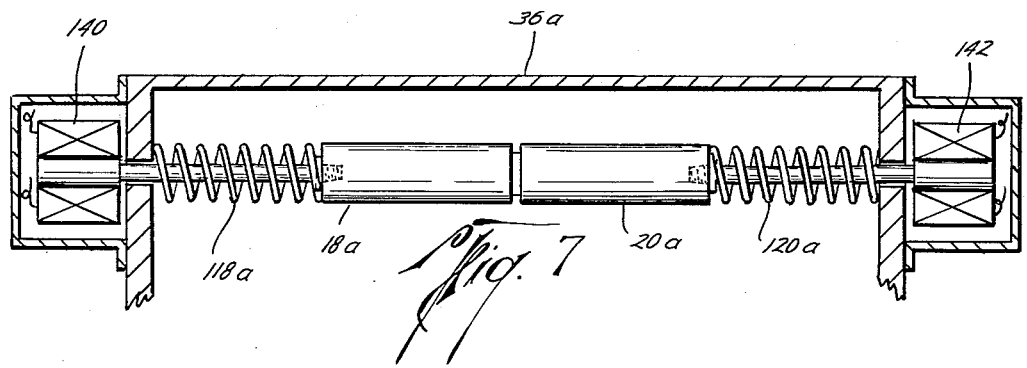
Figure 8:
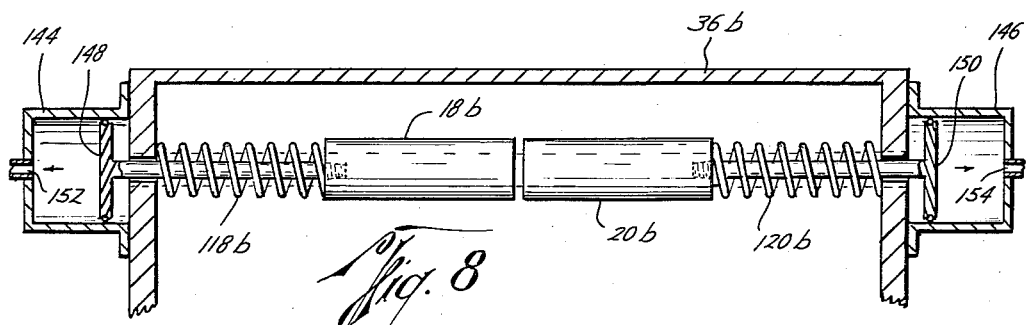
Figure 9:
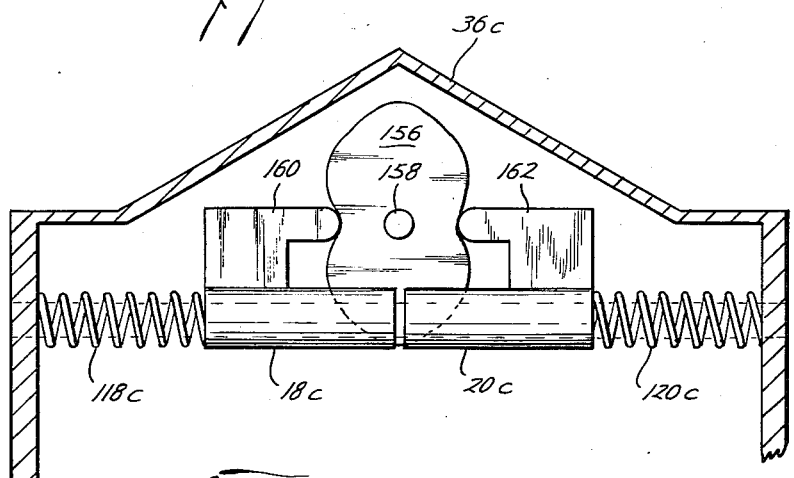

Other and further objects, features and advantages will be apparent from the following description of a presently preferred embodiment of the invention, given for the purpose of disclosure and taken in conjunction with the accompanying drawings, where like character references designate like parts throughout the several views, and where, FIGURE 1 is a side elevational view of the gear shifting mechanism, partly diagrammatic, according to the present invention as applied to a conventional truck transmission, FIGURE 2 is a cross-sectional view taken along the line 2—2 of FIGURE 11, FIGURES 3 and 4 and 5 are views taken along the line 3—3 of FIGURE 11 showing the action of the present mechanism in the process of changing gears. The particular gear is shown in neutral position in FIGURE 3, FIGURE 4 shows the shifting carriages, one of which is engaging a selected gear dog, and FIGURE 5 shows the gears being engaged after movement of the gear shifter by a moving carriage, FIGURE 6 is a cross-sectional view taken along the line 6—6 of FIGURE 11 showing a fluid cylinder used as the source of power for changing gears, FIGURE 7 is a cross-sectional view taken along the line 6—6 of FIGURE 11 and shows an electric solenoid as the source of power for changing gears, FIGURE 8 is a cross-sectional view taken along the line 6—6 of FIGURE 11 and shows a vacuum cylinder as the source of power for changing gears, FIGURE 9 is a cross-sectional view taken along the line 6—6 of FIGURE 11 showing a mechanical cam as the source of power for shifting gears, FIGURE 10 is a view similar to FIGURE 6 but shows a fluid cylinder used as a source of power for changing gears, FIGURE 11 is a cross-sectional view taken along the line 11—11 of FIGURE 3, and FIGURE 12 is a view similar to FIGURE 3 showing modified engaging means for the gear selection and in addition provides for the use of a manual gear operating lever.

Referring now to the drawings, and particularly to FIGURES 1 and 2, the numeral 10 generally indicates the gear shifting mechanism of the present invention, and broadly includes a plurality of gear shifters 12, 14 and 16, which move their respective gears into and out of contact by the action of movable carriages 18 and 20. Engaging means such as dogs 22, 24, 26, 28, 30 and 32 (not shown), each corresponding to a particular gear, are provided which are selectively actuated by an individual gear selector means 34 for each gear so as to engage the dogs with the carriages. Thus, when a preselected dog is engaged for a particular gear and the carriages are suitably actuated the preselected gear shifted is moved thereby engaging the particular preselected gear. The present gear shifting mechanism is shown as having six dogs, which when all are utilized is capable of shifting six gears, but of course, any desired number may be provided.

A suitable frame or housing 36 is provided which may be suitably connected onto a conventional transmission, such as truck transmission 38 for purposes of illustration, and as best seen in FIGURE 1, the truck transmission 38 includes the drive shaft 40, first and second shifting gears 42 and 44 and third and fourth shifting gears 46 and 48, and a reverse gear (not shown). A conventional clutch, generally designated by the reference numeral 50 is illustrated as connected to a conventional crank shaft 52 and drive shaft 54 in the usual manner.

Referring now to FIGURE 2, a plurality of shafts 56, 58 and 60 are provided which are mounted on and supported by the housing 36. Gear shifter 12 is slidably mounted on shaft 56 and is the first and second gear shifter and includes the first and second gear shifting finger 62 (FIGURES 1 and 11). Gear shifter 14 is slidably mounted on shaft 58 and is the third and fourth gear shifter and includes third and fourth gear shifting finger 64 (FIGURES 1, 3–5, 11 and 12). Gear shifter 16 is slidably mounted on the shaft 60 and is the reverse gear shifter and includes the reverse gear shifting finger 66 (FIGURE 11) and a fifth forward gear, if desired. Thus, when one of the gear shifters 12, 14 or 16 is moved longitudinally in one direction one particular gear is engaged and if the gear shifter is moved in the other direction, another shifting gear is engaged.

In order to move the gear shifters 12, 14 and 16, gear shifting carriages 18 and 20 (FIGURES 2, 3, 11 and 12) are provided which are mounted for longitudinal movement along at least one, and preferably all of the shafts 56, 58 and 60. As will be more fully explained hereinafter, suitable means are provided for moving the carriages 18 and 20 away from each other and toward each other for shifting a particular preselected gear.

Suitable engaging elements are mounted on each gear shifter and at least one of said carriages for interlocking the gear shifters with one of the carriages. For instance, each of the dogs coact with a carriage shoulder to interlock a particular shifting gear with a shifting carriage so that a particular gear can be shifted. Thus, referring to FIGURES 3, 4 and 5, dog 26 interlocks with the carriage shoulder 70 and dog 28 interlocks with carriage shoulder 72. Normally, all of the interlocking or engaging means such as the dogs and shoulders are kept out of engagement such as by springs 74 and 76 acting against dogs 26 and 28, respectively. The dogs are suitably pivoted about pins such as dog 26 about pin 78 and dog 28 about pin 80. Each of the dogs by coacting with one of the shifting carriages 18 or 20 interlocks one of the gear shifters and one of the carriages whereby a particular gear is shifted when the carriage is actuated.

As previously mentioned the engaging or interlocking means such as the dogs are normally held out of engagement by their respective holding springs. And also normally, and as best seen in FIGURE 3, the dogs and thus the gears are in a neutral or disengaged position. That is, the dogs 26 and 28 have neutral engaging shoulders 27 and 29, respectively and the other dogs have similar shoulders. These shoulders 27 and 29 are normally locked about case shoulders 31 and 33, respectively. In this locked or neutral position the gear 124 is disengaged or in neutral.

Any suitable gear selector means may be provided to selectively actuate one of the interlocking or engaging dogs so that they will become engaged with one of the carriages when the carriages are shifted. Thus, gear selector solenoids 82 and 84 (FIGURE 1), 86 and 88 (FIGURE 3) and 90 (not shown) may be provided adjacent one of the gear selector dogs so as to yieldably press and attempt to disengage the selected dog from its neutral position, and to engage the dog with its respective carriage shoulder interlock. Thus, the gear selector solenoids 88, 84, 86 and 90 when energized press downwardly to push a selector foot against the corresponding selector dog. Thus, referring to FIGURE 3, solenoid 86 acts to push selector foot 92 downwardly out of neutral and attempts to move dog 26 downwardly into engagement with shoulder 70. Similarly, electric solenoid 88 may act to attempt to push selector foot 94 downwardly to act on dog 28. Solenoid springs 96 and 98 yieldably act to move selector feet 92 and 94, respectively out of engagement with the dogs 26 and 28, respectively. Similarly, the other dogs have similar solenoid gear selector means.

Referring to FIGURE 1, a suitable gear selector control switch 100 is provided whereby the gear desired may be selected which in turn actuates the desired gear selector means 34 so as to preselect the gear which is next to be engaged.

However, referring now to FIGURES 3–5, it is noted that even though one of the gear selector means 34 is actuated or preselected and thus actuated, this action acts merely as a preselection of the desired gear, but does not actuate or shift the gears. That is, the carriages 18 and 20 by being in their normal positions together and under the dogs prevent movement of the dogs and their engagement with their coacting carriage shoulders. Thus, the actuation of a gear selection means by the gear selector control 100 (FIGURE 1) merely selects in advance the gear which the operator desires to use next.

In order to actually shift the gears, the carriages 18 and 20 must move outwardly in a longitudinal direction so that the shoulders on the carriage will allow the particular dog being actuated to move downwardly out of neutral and engage a carriage shoulder. Thus, referring to FIGURE 4, the carriages 18 and 20 have moved outwardly, dog 26 has moved out of neutral thereby disengaging shoulders 27 and 31 and carriage shoulder 70 will engage the dog 74 as the solenoid foot 92 now continues to act and move the dog 74 downwardly to engagement with the shoulder 70.

Of course, any desired means may be used to move the carriages 18 and 20 away from and toward each other. For instance, referring to FIGURES 2, 6 and 11 a suitable fluid cylinder 102 having a fluid entrance 104 may be provided. Pistons 106 and 108 are slidably positioned in the cylinder 102 on either side of the inlet 104 and thus move apart when fluid such as air or hydraulic fluid is forced into the cylinder 102 and against the piston cups 110 and 112. Piston rods 114 and 116 are connected to the pistons 106 and 108, respectively and are slidable through the cylinder 102 and connected to the shifting carriages 18 and 20, respectively. In addition, the carriages are slidable with respect to the cylinder 102. Thus, as fluid is admitted to the cylinder 102 and forces the pistons 106 and 108 apart the piston rods 114 and 116 move the shifting carriages 18 and 20 apart. When the fluid is allowed to pass out of the cylinder 102 through the pipe 104, the springs 118 and 120 act against the carriages 18 and 20, respectively to move the carriages together again. Spring 122 is provided in the hydraulic cylinder 102 and acts between the piston cups 110 and 112 so as to maintain them in place.

As the shifting carriages 18 and 20 are moved away from and toward each other they engage the dog of the preselected gear and as they are moved back together again they shift the preselected gear into position. Thus, referring to FIGURES 3–5, the gear shifting mechanism for shifting gears 3 and 4 is shown. In these figures 124 is the primary movable transmission drive gear, gear 126 is the stationary transmission secondary driven gear, shaft 128 is the primary transmission shaft and shaft 130 is the secondary transmission shaft.

Then as shown in FIGURE 3, gear shifter 14 for shifting the third and fourth gears is shown in the neutral position with the third gear dog 26 and the fourth gear dog 28 in neutral and out of engagement with the shifting carriages 18 and 20 and the movable transmission gear 124 in neutral and out of engagement with the stationary third transmission driven gear 126. Assuming that gear preselector switch 100 is actuated for selecting the third gear, the solenoid 86 will be actuated thereby pressing the gear selector foot 92 downwardly against the dog 26. However, as shown in FIGURE 3, this does not cause any movement of the gears as the dog 26 is unable to be moved downwardly. However, and referring to FIGURE 4, as soon as a suitable gear shifting control mechanism is actuated the shifting carriages 18 and 20 are moved apart by any suitable mechanism such as the cylinder and piston arrangement previously described and shown in FIGURES 2, 6 and 11. At this time the solenoid actuated gear selector 92, which is still acting against the dog 26, will move the dog 26 downwardly and out of its normal neutral postion and into engagement with the carriage shoulder 70 on the movable carriage 18. However, it is noted that the dog 28 does not move downward and engage the shoulder 70 of carriage 20 as its gear selector switch has not been actuated and its retaining spring 76 retains it upwardly in its normal position.

Referring to FIGURE 5, the carriages 18 and 20 are again returned to their original position by the action of the springs 118 and 120. It is to be noted that the neutral shoulder 27 on dog 26 has moved under the housing 36 thereby locking the dog into engagement with carriage shoulder 70 until the dog 26 is returned to a neutral position. Because the dog 26 is interlocked with the shifting carriage 18, the gear shifter 14 and the third and fourth gear shifting finger 64 are moved longitudinally. Thus, gear 124 moves into contact and meshes with third gear 126. Of course, during the time that the carriages are moved outwardly and together again suitable mechanism such as shown in my Patent No. 2,785,-779 disengages the clutch substantially simultaneously with the initial movement of the shifting carriages and re-engages the clutch after movement of the selected gear shifter.

The reverse process takes place in disengaging the gears 124 and 126 and moving the third and fourth gears back to the neutral position as shown in FIGURE 3. However, it is to be noted that when the carriage 18 moves outwardly in the reverse process an outer shoulder 134 on the shifting carriage 18 engages a shoulder 132 (FIGURE 5) on the gear shifter 14 thus returning the gear shifter 14 to the neutral position in FIGURES 3 and 4. However, it is to be noted that in reversing this process of changing from the third gear to neutral that the gear selector foot 92 in FIGURE 4 would be in a retracted position thereby allowing dog 26 to move upwardly by the action of its spring 74.

Of course, various other mechanisms and power sources may be used for providing the means for moving the carriages 18 and 20 away from and toward each other. FIGURES 7, 8, 9 and 10 illustrate modifications of the carriage moving means according to the invention, the letters "a," "b," "c," and "d" being applied to the parts corresponding to those in FIGURES 2–6 for convenience of reference. FIGURE 7 shows the use of electric solenoids as the source of power for moving the carriages 18a and 20a away from each other and springs 118a and 120a for returning the carriages together. Thus, when the solenoid 140 and 142 are suitably actuated they pull the shifting carriages 118a and 120a, respectively toward the solenoids and after the electrical power is switched off the solenoids 140 and 142, the spring 118a returns carriage 118a and the spring 120a returns carriage 20a.

Referring now to FIGURE 8, the modified structure shows the use of another fluid cylinder as a source of power. In this structure suitable cylinders 144 and 146 are provided having pistons 148 and 150 respectively. Cylinder 148 is connected to the movable carriage 18b and the piston 150 is connected to the carriage 20b. Suitable vacuum lines 152 and 154 are connected to the cylinders 144 and 146, respectively. Thus, when a vacuum is applied to the connections 152 and 154 the pistons 148 and 150 are moved outwardly thereby moving the shifting carriages 18b and 20b away from each other. And similar to the actions of the other devices, when the vacuum is released the springs 118b and 120b will press against and move the carriages 18b and 20b back to their original positions.

Referring now to FIGURE 9, a mechanical cam is shown as the source of power for moving the shifting carriages 18c and 20c away from each other. As the cam 156 is rotated about its shaft 158 the cam followers 160 and 162 which are connected to the carriages 18c and 20c, respectively are moved outwardly thereby moving the carriages away from each other. As the cam is rotated 180° the springs 118c and 120c act against the carriages 18c and 20c to return them to their original positions.

Referring now to FIGURE 10, a fluid cylinder built into the shifting carriage is provided which serves as a source of power for moving the carriages away from each other is shown. Fluid cylinders 164 and 166 are built in and made a part of the carriages 18d and 20d. Pistons 168 and 170 are provided in the cylinders 164 and 166, respectively. A fluid supply line 172 is provided leading through each of the pistons 168 and 170.

Thus, as fluid is applied through the line 172 the cylinders 164 and 166 and consequently their attached carriages are forced apart. After the fluid pressure is relieved in the line 172, the springs 118d and 120d return the cylinders 164 and 166 to their original positions.

The foregoing structure generally shows the use of an automatic operation for the step of actually shifting of the gears. However, it is also desirable to have a manual shift lever to be used in the event that the auxiliary power operating and shifting the carriages 18 and 20 has broken down or is unavailable for other reasons. Thus, FIGURE 12 shows the operation and structure to provide the manual shifting of the carriages 18 and 20. Suitable carriage extensions 176 and 178 having shoulders 180 and 182 are provided on the carriages 18 and 20, respectively. A suitable manual operation lever 184 is provided to be pivoted around the shaft 186 thereby to move one of the carriages and then the other carriage out of its neutral position thereby to engage the interlocking means and allow the springs 118 and 120 to return the carriages 18 and 20 to their neutral positions and shift the gears. It is to be noted in FIGURE 12 that selector pins 188 and 190 (the springs normally holding the pins out of engagement have been omitted for clarity) have been substituted for the dogs shown in the previous figures, but perform the same function and operate similar to the interlocking dogs.

In operation, the gear shifting assembly 10 of the present invention may be connected to any transmission such as automobile, bus, truck or the like by connecting the housing or frame 10 to the upper portion of the transmission although it may be secured thereto in other suitable ways.

When it is desired to shift from one gear to another, the gear selector lever 100 is positioned to select the desired gear in advance of the actual shifting operation. It is then only necessary to actuate the lever 200 which in turn actuates the power to automatically shift the shifting carriages 18 and 20. With the lever 200 actuated and the carriages 18 and 20 shifted outwardly as shown in FIGURE 4 all of the gear shifters 12, 14 and 16 are in the neutral position as best seen in FIGURE 2. Also, when the shifting carriages are moved outwardly, the preselected gear selector switch is actuating the gear selector means such as solenoid 86 in FIGURES 3, 4 and 5, assuming that it is desired to shift to third gear. The actuation of the gear selection lever 100 has previously energized the solenoid 86 thereby pushing the selector foot 92 downwardly against the dog 26. The dog 26 remains in its upward and neutral position until the carriage 18 moves outwardly and at that time as shown in FIGURE 4 allows the foot 92 to press the dog 26 into engagement with the shoulder 70 on the carriage 18.

At this position with the carriages 18 and 20 in their outward position, all the other gear selector dogs (since they are unactuated at this time) will be in the upright position as the gear selector lever 100 actuates only solenoid 86 and de-energizes the remainder of the gear selector solenoids. At this point the shifting carriages 18 and 20 are ready to be moved back to their original positions. Thus when the gear shifting lever 200 is released the carriage actuating force, whatever it may be, allows the springs 118 and 120 to move the shifting carriages 18 and 20 back to their original positions. However, as the dog 26 is engaged with and interlocked with the shoulder 70 of the shifting carriages 18 the movement of the carriage 18 to its original position, as best shown in FIGURE 5, shifts the gear shifter 14 and meshes the gear 124 into engagement with gear 126. The dogs and their corresponding gears on gear shifters 12 and 16 will be returned to neutral.

It is to be noted that the gear selector lever 100 is positioned to preselect the desired gear in advance of the actual shifting operation. The operator then in shifting need only to move the lever 200 on and off and the gears are automatically shifted without resulting in a loss of momentum of the vehicle, strain on the gears or transmission and positively engages and shifts the gears. Of course, a clutch 26 is engaged and disengaged with the initial movement of the shifting carriage 18 and 20 and is re-engaged after they have been returned to their renewed positions by any suitable mechanism.

While the gear shifting lever 200 is shown as actuating the vacuum cylinder of FIGURE 8, it is obvious that any conventional switch may be used to actuate the fluid cylinders of FIGURES 6 and 10, the electric solenoids 140 and 142 of FIGURE 7, and the cam of FIGURE 9 so as to move the carriages 18 and 20 to their outward positions.

It is also noted in FIGURE 12 that an additional manual operating lever 184 is provided for manually shifting the carriages 18 and 20 in the event that the auxiliary power for shifting the carriages fails or is unavailable for some reason.

While the gear shifting mechanism of the present invention is shown as changing the gears of a single transmission, the mechanism can be connected to and operate more than one transmission at the same time in order to provide multiple speed transmission.

The present invention, therefore, is well adapted to carry out the objects and attain the ends and advantages mentioned as well as others inherent therein.

While presently preferred embodiments of the invention are given for the purpose of disclosure, numerous changes in the details of construction and arrangement of parts may be made which will readily adjust themselves to those skilled in the art and which are encompassed within the spirit of the invention and the scope of the appended claims.

What is claimed is:

1. A gear shifting mechanism for actuating a plurality of shifting gears comprising:
   a frame,
   a plurality of shafts secured to said frame,
   a plurality of gear shifters connected to the shifting gears, each of said gear shifters movably mounted on one of said shafts for longitudinal movement along said shaft in either direction,
   neutral engaging elements connected to each of said gear shifters and engageable with said frame, said neutral engaging elements engaged with the frame when the gear shifters are in neutral position,
   a gear shifting carriage mounted for longitudinal movement in either direction along at least one of said shafts,
   means for moving said carriage in either direction along said one shaft,
   gear engaging elements mounted on each gear shifter and engageable with said movable carriage for interlocking the gear shifters with the carriage,
   contacting shoulders between each of the gear shifters and said carriage whereby the shifters may be contacted and moved by the movement of said carriage,
   and gear selector means adjacent each of said gear engaging elements for selectively actuating one of said gear engaging elements into engagement with the carriage for interlocking one of said gear shifters with the carriage.

2. A gear shifting mechanism for shifting a plurality of shifting gears comprising:
   a frame adapted to be mounted on a gear transmission,
   a plurality of supporting shafts secured to said frame,
   at least two multiple gear shifters connected to the shifting gears, each of said multiple gear shifters movably mounted for longitudinal movement on one of said shafts,
   two gear shifting carriages mounted for longitudinal movement along at least one of said shafts,
   means connected to said carriages for moving the carriages away from each other,
   spring means connected between said frame and each of said carriages for moving the carriages toward each other,
   gear engaging elements connected to each of said gear shifters and engageable with one of said carriages for interlocking the gear shifters with one of the carriages,
   means normally holding said gear engaging elements out of engagement with said carriages,
   neutral engaging elements connected to each of said gear shifters and engageable with said frame, said neutral engaging elements engaged with said frame when the gear shifters are in the neutral positions,
   contacting shoulders between each of the gear shifters and each of said carriages whereby the shifters may be contacted and moved by the movement of said carriages thus moving the gears into the neutral position,
   and gear selector means adjacent each of said gear engaging elements for selectively actuating one of said gear engaging elements into engagement with one of the carriages thereby interlocking one of said gear shifters and one of said carriages.

3. A gear shifting mechanism for shifting a plurality of shifting gears comprising:
   a frame adapted to be mounted adjacent the gear transmission,
   a plurality of shafts secured in said frame,
   at least two U-shaped multiple gear shifters connected to the shifting gears, each of said multiple gear shifters being movably mounted by the legs of the U on one of said shafts for longitudinal movement in either direction,
   two gear shifting carriages mounted for longitudinal movement along at least one of said shafts and mounted between the legs of the U-shaped gear shifters,
   means connected to said carriages for moving said carriages away from each other whereby the carriages contact each leg of the gear shifters and move the gear shifters to a neutral position,
   a movable engaging dog for each gear connected to one of said gear shifters, said dog engaging said frame to hold said gear shifters when the gear shifters are positioned in a neutral position and when actuated engaging one of said carriages,
   and gear selector means adjacent each of said dogs for selectively actuating one of said dogs into engagement with one of said carriages.

4. The invention of claim 3 including:
   spring means yieldably urging said carriages toward each other.

5. The invention of claim 4 including:
   means limiting the travel of said gear shifters in either direction.

References Cited in the file of this patent
UNITED STATES PATENTS

| | | |
|---|---|---|
| 1,363,628 | Webster | Dec. 28, 1920 |
| 1,363,629 | Webster | Dec. 28, 1920 |
| 1,363,661 | Langley | Dec. 28, 1920 |
| 1,363,662 | Langley | Dec. 28, 1920 |
| 1,982,976 | Alltree | Dec. 4, 1934 |
| 2,193,432 | Randol | Mar. 12, 1940 |